(12) United States Patent
Benthien et al.

(10) Patent No.: US 9,764,815 B2
(45) Date of Patent: Sep. 19, 2017

(54) AIRCRAFT FUSELAGE STRUCTURE

(71) Applicant: Airbus Operations GmbH, Hamburg (DE)

(72) Inventors: Hermann Benthien, Sottrum (DE); Cord Haack, Beckdorf (DE); Andreas Poppe, Reeβum (DE); Michael Burrichter, Stuhr-Brinkum (DE); Torsten Abraham, Hildesheim (DE); Michael Brinckmann, Bremen (DE); Christoph Dierker, Bremen (DE); Frank Werth, Stuhr (DE); Wulf Bindewald, Syke (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 534 days.

(21) Appl. No.: 14/487,727

(22) Filed: Sep. 16, 2014

(65) Prior Publication Data

US 2015/0102168 A1 Apr. 16, 2015

Related U.S. Application Data

(63) Continuation of application No. PCT/EP2013/055332, filed on Mar. 15, 2013.
(Continued)

(30) Foreign Application Priority Data

Mar. 16, 2012 (DE) .......................... 10 2012 005 352

(51) Int. Cl.
*B64C 1/26* (2006.01)
*B64C 1/06* (2006.01)

(52) U.S. Cl.
CPC ................ *B64C 1/068* (2013.01); *B64C 1/26* (2013.01)

(58) Field of Classification Search
CPC combination set(s) only.
See application file for complete search history.

(56) References Cited

U.S. PATENT DOCUMENTS

| 2,538,433 | A | * | 1/1951 | Snyder | ...................... | B64C 3/00 |
| | | | | | | 244/117 R |
| 7,316,372 | B2 | * | 1/2008 | Sarpy | ........................ | B64C 1/26 |
| | | | | | | 244/119 |

(Continued)

FOREIGN PATENT DOCUMENTS

| DE | 10 2006 051 572 | 5/2008 |
| DE | 10 2008 041 317 | 3/2010 |

(Continued)

OTHER PUBLICATIONS

German Search Report for Application Serial No. 10 2012 005 352.5 dated Mar. 21, 2013.

(Continued)

*Primary Examiner* — Christopher P Ellis
(74) *Attorney, Agent, or Firm* — Jenkins, Wilson, Taylor & Hunt, P.A.

(57) ABSTRACT

An aircraft fuselage structure is disclosed herein and includes an outer skin, with circumferential ribs, such that a recess is provided for receiving a wing torsion box in the outer skin, and the ribs are interrupted in the region of the recess. An object of the disclosure includes providing an aircraft fuselage structure designed such that the wing torsion box is able to extend at least partially through the upper region of the fuselage, without the stability of the fuselage being significantly reduced. This can include providing first longitudinal members which are adjacent to the recess and which extend along the longitudinal edges beyond the entire length thereof. End regions of the first longitudinal members are connected to ribs which extend (Continued)

circumferentially at intervals from the transverse edges of the recess along the outer skin over the vertical longitudinal central plane.

8 Claims, 7 Drawing Sheets

Related U.S. Application Data

(60) Provisional application No. 61/611,852, filed on Mar. 16, 2012.

(56) References Cited

U.S. PATENT DOCUMENTS

| | | | | |
|---|---|---|---|---|
| 8,740,150 B2* | 6/2014 | Werth | ........................ | B64C 1/26 244/131 |
| 9,248,902 B2* | 2/2016 | Benthien | .................... | B64C 1/26 |
| 2008/0272236 A1* | 11/2008 | Rawdon | .................... | B64C 1/08 244/118.1 |
| 2009/0146007 A1* | 6/2009 | Keeler, Jr. | ................. | B64C 1/26 244/119 |
| 2010/0170987 A1* | 7/2010 | Meyer | ........................ | B64C 7/00 244/120 |
| 2011/0233335 A1* | 9/2011 | Vinue Santolalla | .... | B64C 1/061 244/119 |
| 2011/0266398 A1* | 11/2011 | Voss | .......................... | B64C 1/26 244/45 R |
| 2012/0211602 A1* | 8/2012 | Dugerie | ................ | B64C 1/1461 244/119 |
| 2012/0261510 A1* | 10/2012 | Bogiatzis | .................. | B64C 1/26 244/119 |
| 2014/0197277 A1* | 7/2014 | Otto | .......................... | B64C 1/10 244/119 |
| 2014/0231586 A1* | 8/2014 | Brown | ...................... | B64C 1/26 244/119 |
| 2014/0361121 A1* | 12/2014 | Cominsky | ................. | B64C 1/26 244/131 |
| 2015/0034765 A1* | 2/2015 | Gonzalez Gozalbo | ... | B64C 5/16 244/120 |
| 2016/0152315 A1* | 6/2016 | Martino Gonzalez | .... | B64C 1/06 244/13 |
| 2016/0185439 A1* | 6/2016 | Martino Gonzalez | .... | B64C 1/16 244/35 R |
| 2016/0311515 A1* | 10/2016 | Guillemaut | ............... | B64C 1/26 |

FOREIGN PATENT DOCUMENTS

| | | |
|---|---|---|
| EP | 2 239 195 | 10/2010 |
| WO | WO 2010/020632 | 2/2010 |

OTHER PUBLICATIONS

International Search Report for Application Serial No. PCT/EP2013/055332 dated May 21, 2013.
International Preliminary Report on Patentability and Written Opinion for Application Serial No. PCT/EP2013/055332 dated Sep. 16, 2014.
Niu Michael C Y: "Airframe Structural Design, 2nd Edition, ISBN 962-7128-09-0, Passage", Airframe Structural Design, Commilit Press, Hong Kong, HK, Feb. 1, 2002, pp. 408-409, figure 11.4.

* cited by examiner

AIRCRAFT FUSELAGE STRUCTURE

CROSS REFERENCE TO RELATED APPLICATIONS

This application relates and claims priority to International Application Serial No. PCT/EP2013/05532, filed on Mar. 15, 2013, which claims priority to U.S. Provisional Patent Application Ser. No. 61/611,852, filed Mar. 16, 2012. The entire contents of each of these references are hereby incorporated by reference herein.

TECHNICAL FIELD

The present subject matter relates to an aircraft fuselage structure, and more particularly to an aircraft fuselage structure extending along a longitudinal axis, comprising an outer skin which surrounds an internal space, comprising a plurality of circumferential ribs which are at intervals from one another and which extend in planes perpendicular to the longitudinal axis along the outer skin, wherein a recess is provided for receiving a wing torsion box in the outer skin, wherein the recess extends in the direction of the longitudinal axis via a plurality of ribs from a front transverse edge to a rear transverse edge, wherein the recess extends in the circumferential direction symmetrically on both sides from a vertical longitudinal central plane as far as longitudinal edges extending parallel to the longitudinal axis, and wherein the ribs are interrupted in the region of the recess.

BACKGROUND

Aircraft fuselage structures are disclosed in DE 10 2006 051 572 A1 and/or US 2011/0266398, which the present disclosure relates to, wherein the publications describe the suspension of the aircraft torsion box on the fuselage structure.

In particular in transport aircraft, it is desirable to configure the transport aircraft as so-called high-wing planes in which the wings are connected to the fuselage in the upper region thereof. A reason for this is that in transport aircraft the loading takes place from the rear and a low loading edge and/or a short distance between the ground and the floor in the aircraft should be present. Moreover, the ground clearance of the propulsion units and optionally the propeller drives have to be sufficient. In this case, the high-wing plane represents an optimal compromise in terms of flow technology between the minimum fuselage cross section and the uninterrupted fuselage, i.e. maximum cargo area.

However, it is also desirable that the wing torsion box, on which the support surfaces are attached and are connected to the fuselage, is not located completely outside and/or above the actual fuselage structure. Otherwise, a relatively high air resistance would result. If the wing torsion box, however, extends transversely through the upper part of the fuselage structure, it is either necessary for the ribs at this point to extend deeper into the internal space in the upper region of the fuselage structure or for the ribs to have to be interrupted in this portion. The first alternative has the drawback that the height of the fuselage internal space is markedly reduced in the region of the wing torsion box. The second alternative represents a requirement with regard to the structural engineering of the aircraft.

In any case, however, the outer skin is interrupted in the upper region although this region has to absorb substantial portions of the loads occurring in the longitudinal direction. This problem is accentuated further when the fuselage is intended to be configured as a so-called pressure fuselage, i.e. a pressure is able to be built inside the fuselage which is above ambient pressure so that the aircraft is also able to fly at high altitudes without passengers and crew having to use breathing apparatus. As a result, however, it is necessary to seal the recess to the wing torsion box, and it has to be ensured that the recess does not deform under load to such an extent that the sealing element incorporated therein is detached from the edge of the recess.

A problem similar to that described above may occur in low-wing planes. In this case, however, the recess in the fuselage is provided in the downwardly facing part.

SUMMARY

It is an object of the present subject matter to provide an aircraft fuselage structure which is designed such that the wing torsion box is able to extend at least partially through the upper region of the fuselage without the stability of the fuselage being significantly reduced and such that the seal of the fuselage is ensured.

This object is achieved in that first longitudinal members are provided, the first longitudinal members being adjacent to the recess and extending along the longitudinal edges beyond the full length thereof, the end regions of the first longitudinal members are connected to ribs which extend circumferentially at intervals from the transverse edges of the recess along the outer skin over the vertical longitudinal central plane, the ends of the ribs facing the recess are connected to the first longitudinal members, second longitudinal members are provided, the second longitudinal members extending parallel and at intervals from the first longitudinal members and being arranged on the side of the first longitudinal members facing away from the recess, and the end regions of the second longitudinal members are connected to ribs which extend circumferentially at intervals from the transverse edges of the recess along the outer skin over the vertical longitudinal central plane.

Using the first and second longitudinal members which in the region of the recess, on the one hand, are connected to the ends of the ribs facing the recess and through which, on the other hand, the ribs extend, loads which otherwise would be absorbed by the upper portion of the fuselage structure are guided around the recess. This is possible, in particular, as the first and second longitudinal members are provided on their end regions with ribs provided in front of and to the rear of the recess, also extending in the upper region of the fuselage structure.

The stabilization of the fuselage in the region of the recess is particularly effective when the ribs extending in the region of the recess, i.e. in the longitudinal direction level with the recess, between the first and the second longitudinal members have rib portions extending perpendicular thereto and which connect the first and the second longitudinal members together.

In order to introduce the loads which are produced by the support surfaces in the X-direction and Z-direction in an effective manner into the fuselage structure, it is also preferred if two of the rib portions have first retaining tabs which extend through recesses in the first longitudinal members and which are provided for connecting to pendulum supports for retaining the wing torsion box.

Moreover, for the same purpose, in a further preferred manner, the second longitudinal members may have second retaining tabs for retaining the support surfaces, wherein the second retaining tabs extend through the outer skin.

In order to guide the loads which are absorbed in the region of the recess, in particular by the first and second longitudinal members, into the region adjacent to the recess in the upper region of the outer skin of the fuselage structure, crossmembers can extend in a linear manner along the transverse edges of the recess, wherein oblique portions are provided between the crossmembers and the outer skin, the oblique portions extending in planes which are inclined relative to the longitudinal axis and which slope away from the outer skin towards the crossmembers.

In a preferred manner, rib elements are arranged on the inwardly facing side of the oblique portions, the rib elements extending perpendicular to the crossmembers, wherein a purpose of the rib elements is such that the oblique surfaces absorb loads in the longitudinal direction.

Moreover, additional members extending at an angle to the ribs may be provided, the additional members extending along the connecting line between the oblique portions and the outer skin and the ends thereof facing the center of the fuselage being connected to the adjacent rib. Due to the curvature of the outer skin, the connecting line between the outer skin and the oblique portions is also curved so that the additional members, in addition to the ribs in this region, permit the loads to be taken up by the first and second longitudinal members in the upper region of the outer skin. If strut elements also extend between the rib elements and the additional members, the take-up of loads is further improved.

BRIEF DESCRIPTION OF THE DRAWINGS

The present subject matter is described hereinafter with reference to drawings showing a preferred exemplary embodiment, wherein.

DETAILED DESCRIPTION

The exemplary embodiment shown in the figures of an aircraft fuselage structure 1 according to the disclosure herein extends along a longitudinal axis X and has a substantially round cross section. The fuselage structure 1 is provided with an outer skin 3 which is formed from aluminium sheet elements and which surrounds the internal space of the structure.

Figure 1:
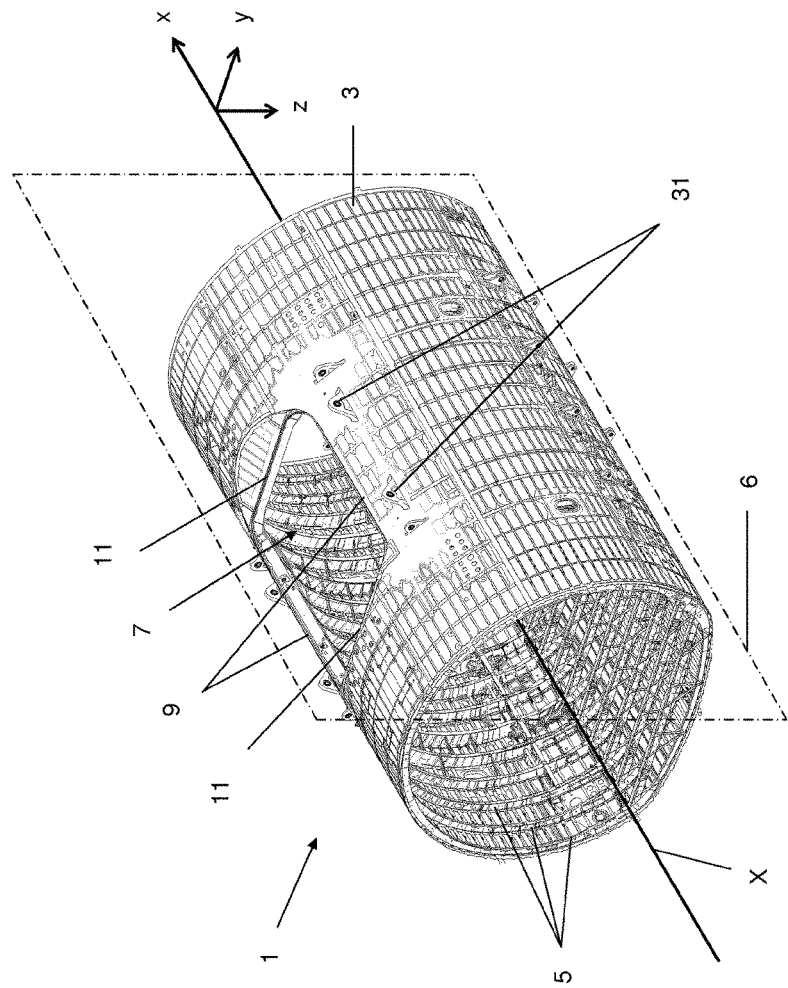
FIG. 1 shows an exemplary embodiment of an aircraft fuselage structure according to the disclosure.

If directions are referred to below, the usual coordinate system in aircraft design and illustrated in FIG. 1 is used, wherein the X-direction extends parallel to the longitudinal axis X and from front to back. The Y-direction extends parallel to the plane of the support surfaces and perpendicular to the X-direction. Finally, the Z-direction faces downwards perpendicular to the X-direction.

The outer skin 3 is retained on the side facing the internal space by a plurality of circumferential ribs 5 which are at intervals from one another and which extend in planes perpendicular to the longitudinal axis X along the outer skin 3.

Figure 2:
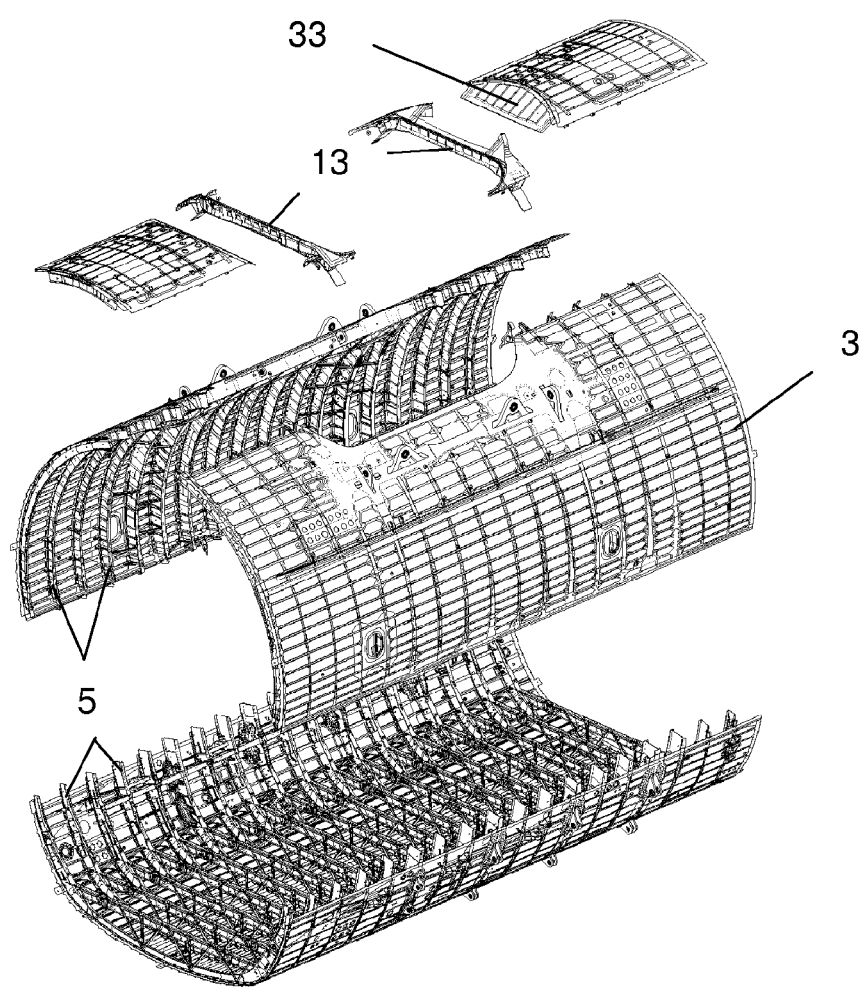
FIG. 2 shows the exemplary embodiment of FIG. 1 in an exploded view.
Figure 3:
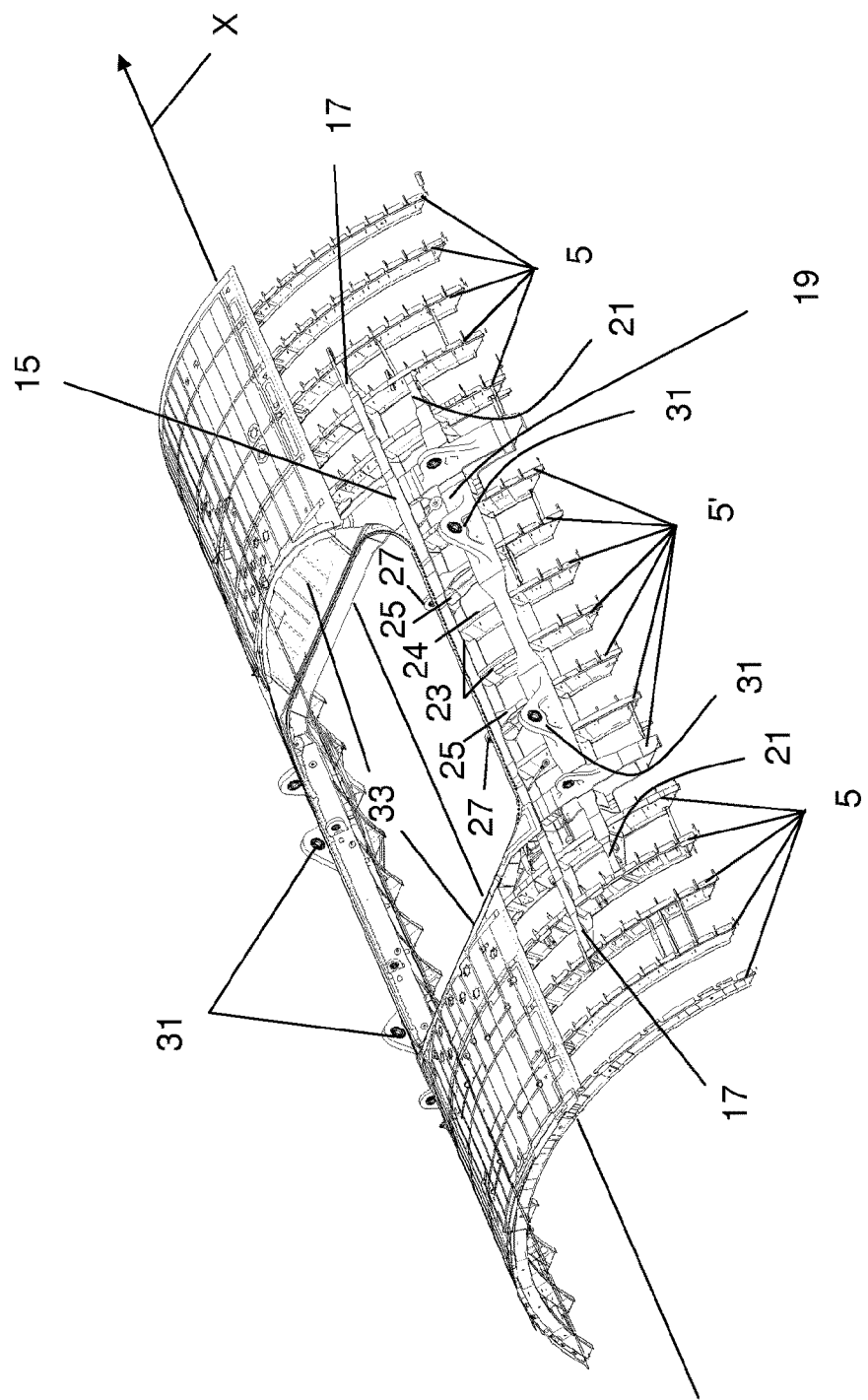
FIG. 3 shows the upper part of the exemplary embodiment of FIG. 1 with the outer skin partially removed.

As may be further seen from FIGS. 1, 2 and 3, in the upper region, symmetrically about a vertical longitudinal central plane 6 extending through the longitudinal axis X, the fuselage structure 1 has a recess 7 which is defined by longitudinal edges 9 extending parallel to the longitudinal axis X and transverse edges 11 extending transversely thereto. The recess 7 thus extends in this exemplary embodiment symmetrically away from the highest point of the fuselage structure 1 on both sides.

This recess 7 is provided for receiving a wing torsion box, not shown in the figures, which serves to connect the support surfaces, also not shown, to one another and to the fuselage, and additionally to absorb the wing moments, i.e. $M_x$ due to the wing bending about the flight axis, $M_y$ due to the wing torsion and $M_z$ due to moments about the vertical axis as a result of the air resistance. The connection of the wing torsion box permits the reduction of the moments as force pairs.

The wing torsion box may extend in the Z-direction into the fuselage through the recess 7 in the fuselage structure 1 so that, as a result, the aforementioned advantages of a high-wing plane produce less air resistance, etc.

The transverse edges 11 of the recess 7 are formed by crossmembers 13 extending in a linear manner, the crossmembers being arranged such that in the region of the vertical longitudinal central plane 6 of the fuselage structure 1 they are spaced apart from the outer skin 3 in the vertical direction (see FIG. 2).

As is visible in particular from FIG. 3, the recess 7 extends in the direction of the longitudinal axis X across a plurality of ribs 5' from the front transverse edge 11 to the rear transverse edge 11, wherein the ribs 5' are interrupted by the recess 7 and thus do not extend over the upper region of the fuselage structure 1.

Along the longitudinal edges 9 of the recess 7 first longitudinal members 15 initially extend immediately adjacent to the recess 7. The longitudinal members 15 in this case extend over the entire length of the recess 7 and the end regions 17 thereof extend beyond the recess 7, viewed in the direction of the longitudinal axis X. In this case, the end regions 17 of the first longitudinal members 15 are fixedly connected to those ribs 5 which extend circumferentially at intervals from the transverse edges 11 and/or the crossmembers 13 along the outer skin 3 and extend across the vertical longitudinal central plane 6 (see FIGS. 3, 4, and 5), viewed in the longitudinal direction X. In this case, the first longitudinal members 15 are also connected to the crossmembers 13.

In addition to the first longitudinal members 15, second longitudinal members 19 extending parallel and at intervals therefrom are provided in the fuselage structure 1, wherein the second longitudinal members 19 extend on the side of the first longitudinal members 15 remote from the recess 7. The second longitudinal members 19 also extend beyond the length of the recess 7, viewed in the X-direction, and the end regions 21 are fixedly connected to ribs 5 which fully extend over the circumference of the fuselage structure 1, and thus also extend in the region of the vertical longitudinal central plane 6.

Figure 5:
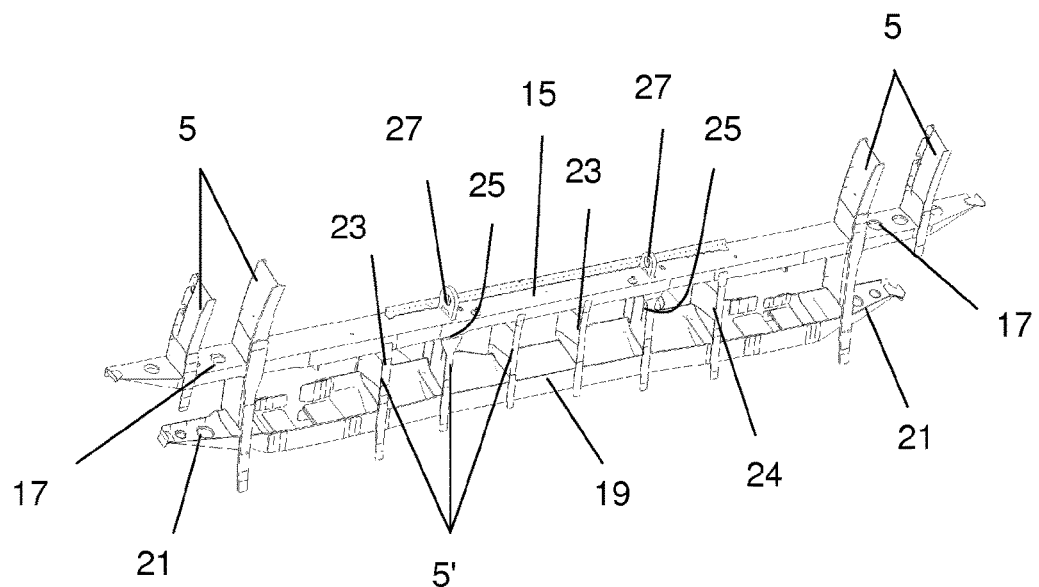
FIG. 5 shows a detail around the longitudinal members of the exemplary embodiment of FIG. 1.
Figure 6:
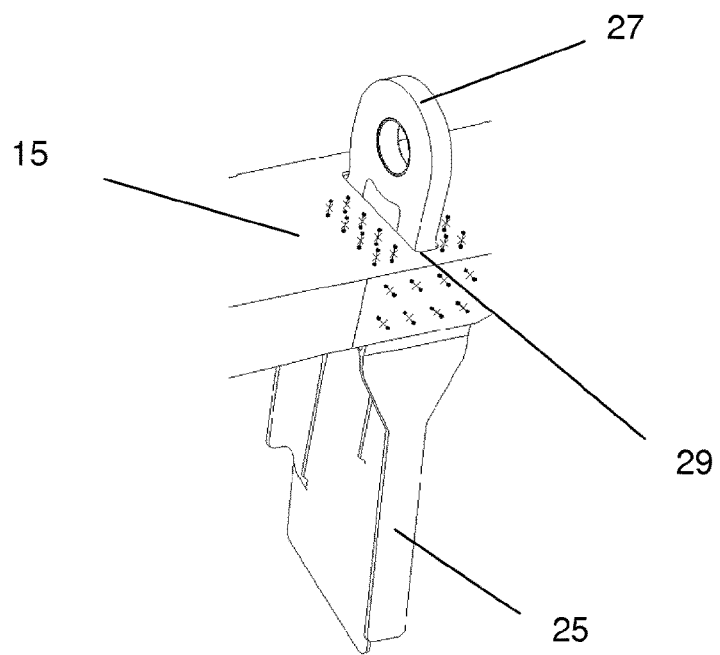
FIG. 6 shows the coupling of a rib to the first longitudinal members of FIG. 1, FIGS. 7 and 8 show perspective views from above and from below of the upper portion of the exemplary embodiment of FIG. 1 adjacent to the recess towards the front.

The free ends 23 of the ribs 5' facing the recess 7, which do not extend over the full circumference of the fuselage structure 1 are fixedly connected to the first longitudinal members 15 (see FIG. 5). The ribs 5' extend through the second longitudinal members 19 and/or across said longitudinal members, wherein tabs are used for connecting the rib portions across the second longitudinal members 19. The ribs 5' thus have rib portions 24 between the first and the second longitudinal members 15, 19, the rib portions extending perpendicular thereto and connecting the first and the second longitudinal members 15, 19 together.

Figure 4:
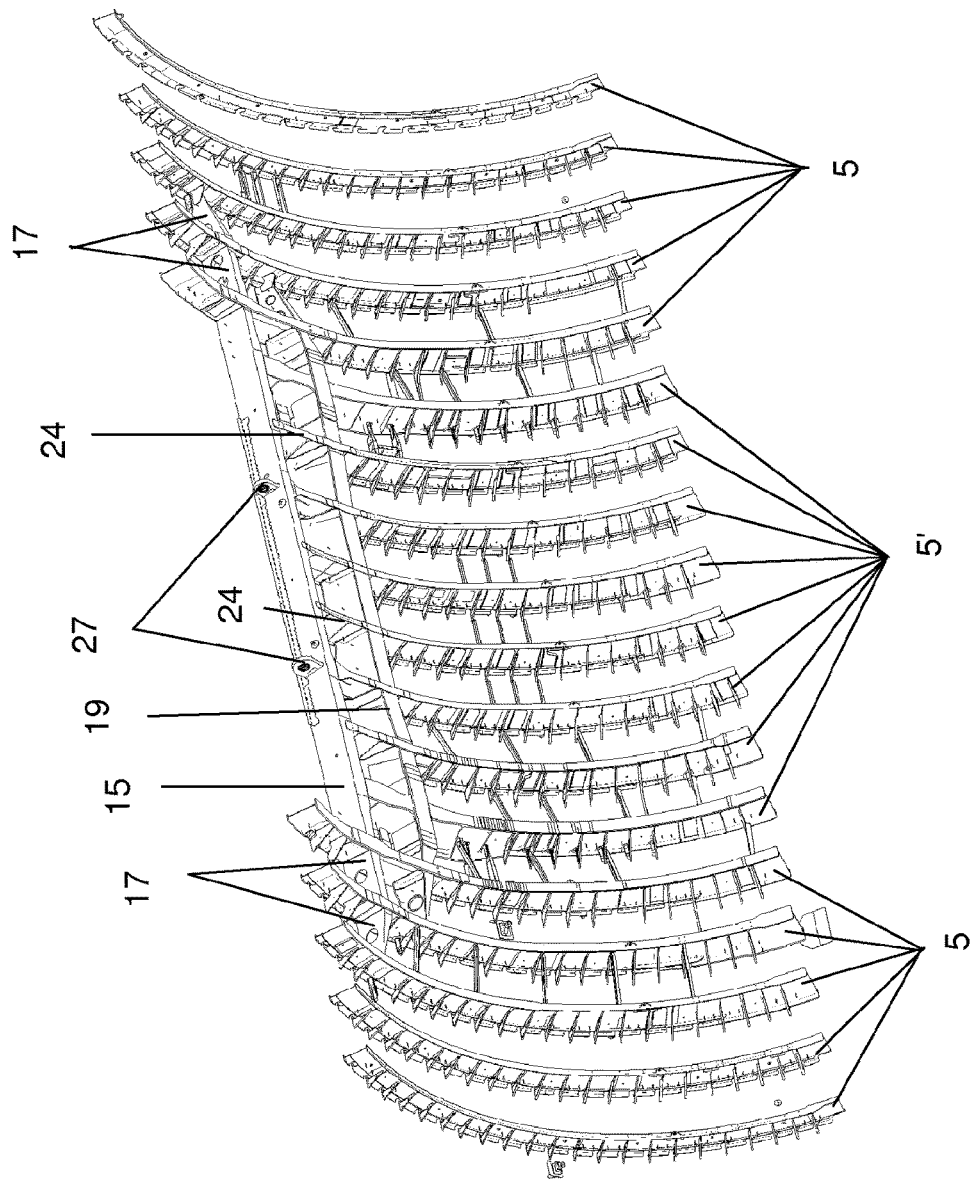
FIG. 4 shows the side part of the exemplary embodiment of FIG. 1 without the outer skin.

Moreover, the free ends 25 of two ribs 5' in the region of the recess 7 have first retaining tabs 27 which extend through corresponding recesses 29 in the first longitudinal members 15 towards the recess 7 (see FIGS. 4 and 5). The first retaining tabs 27 serve to couple the first longitudinal members 15 to the wing torsion box, not shown, to absorb loads. Additionally, the first retaining tabs 27 may be connected to corresponding pendulum supports.

In addition, the second longitudinal members 19 have second retaining tabs 31 for coupling the support surfaces, wherein the second retaining tabs 31 extend to the outside through the outer skin 3 and may also be connected to pendulum supports (see FIGS. 1 and 3).

Figure 7:
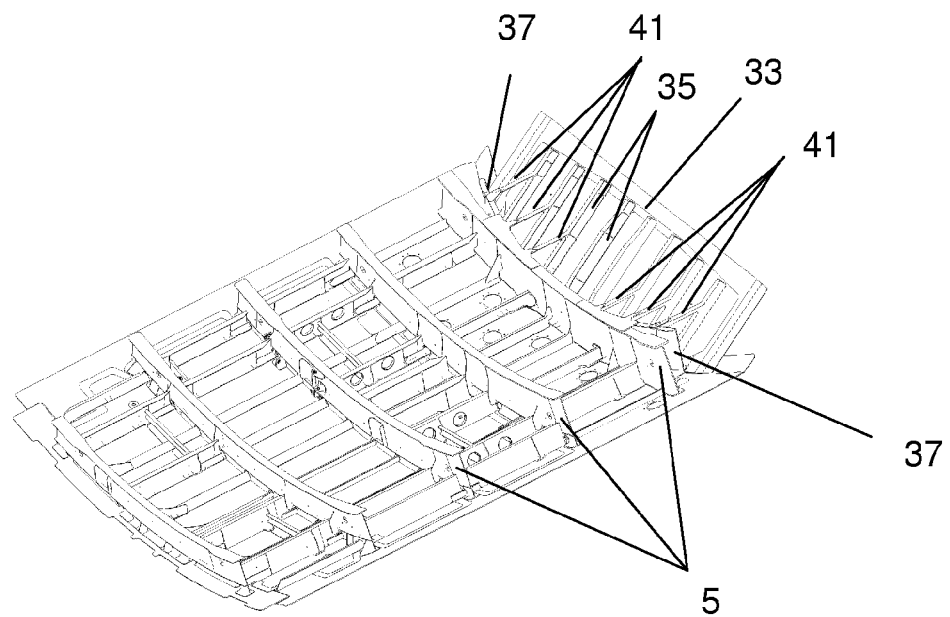
Figure 8:
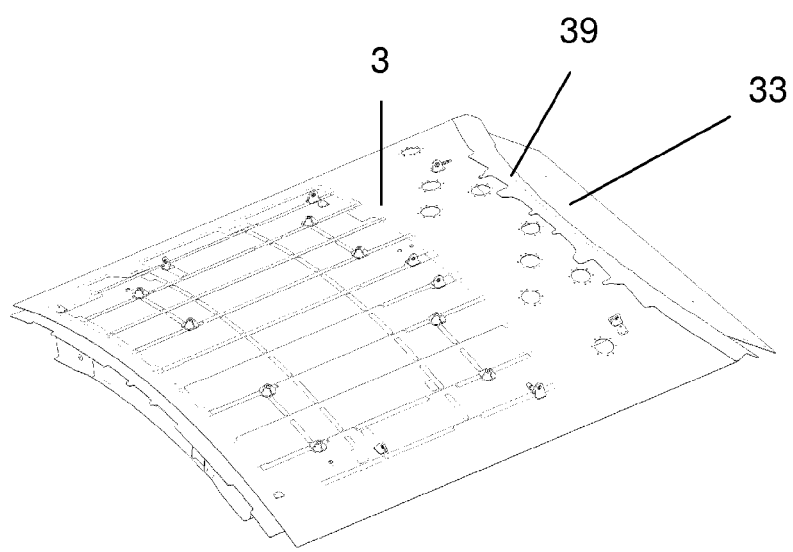
Figure 9:
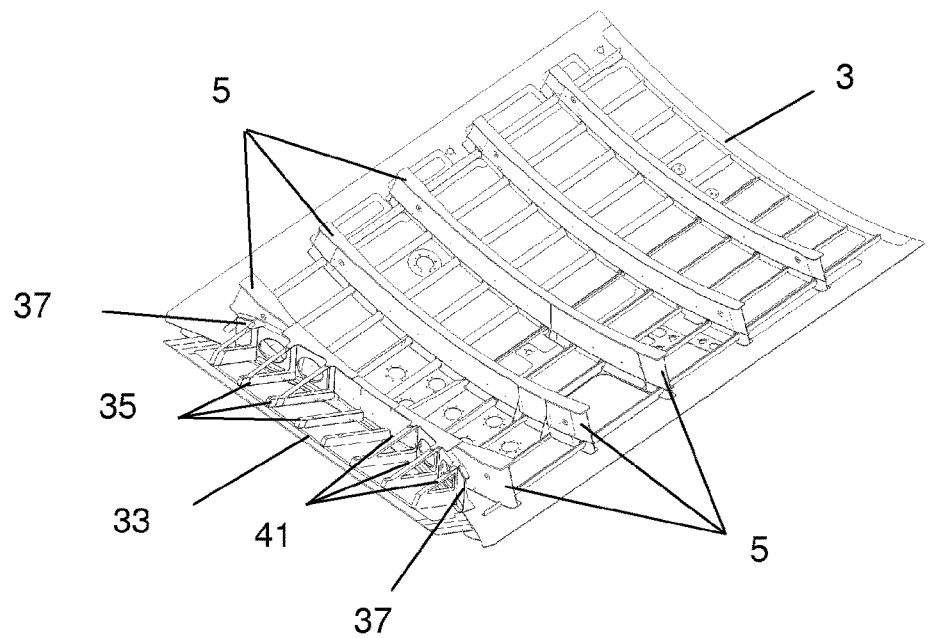
FIG. 9 shows a perspective view from below of the upper portion of the exemplary embodiment of FIG. 1 adjacent to the recess towards the rear.
Figure 10:
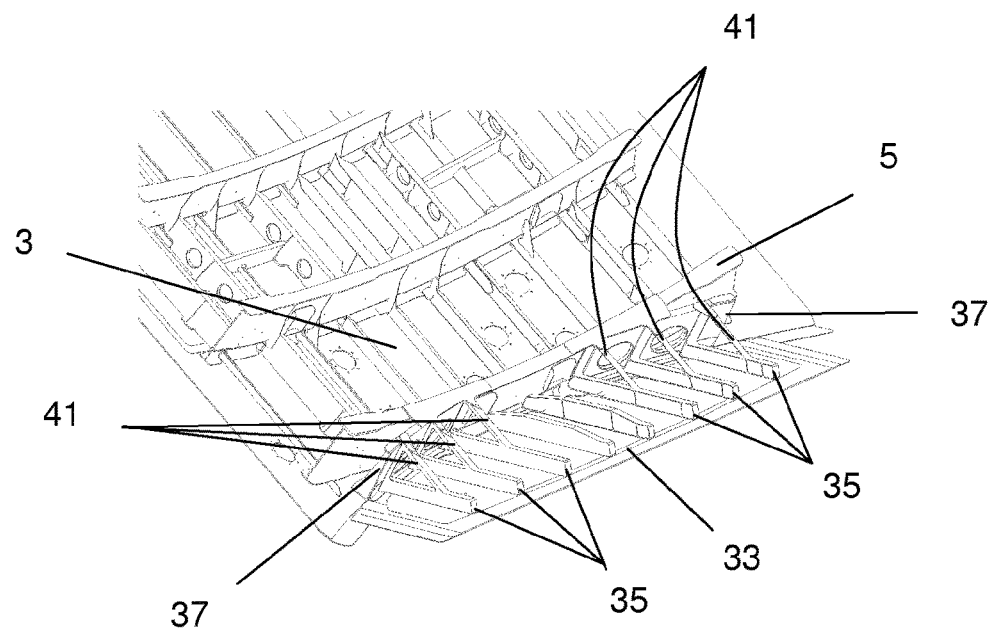
FIG. 10 shows the upper portion of the exemplary embodiment of FIG. 1 adjacent to the recess.

In order to introduce the forces absorbed by the longitudinal members 15, 19 and extending in the direction of the longitudinal axis X in the upper portion of the fuselage structure 1 extending in the vicinity of the vertical longitudinal central plane 6, oblique portions 33 are provided on the outer skin 3, the oblique portions starting from crossmembers 13 extending along the transverse edges 11 of the recess 7, so that the oblique portions 33 connect the crossmembers 13 to the ribs 5 of the outer skin 3 (see FIGS. 7 to 9).

Such oblique portions 33 are provided at both ends and/or both at the front and at the rear transverse edge 11. The oblique portions 33 extend in planes which are inclined relative to the longitudinal axis X and which slope away from the outer skin 3 towards the crossmembers 13.

Moreover, rib elements 35 are provided on the inwardly facing side of the oblique portions 33, the rib elements extending perpendicular to the crossmembers 13 towards the ribs 5 of the outer skin 3 (see FIGS. 7 and 9). To this end, on the ribs 5 which extend immediately adjacent to the recess 7, additional members 37 extending at an angle thereto are provided, the additional members extending along the connecting line 39 between the oblique portions 33 and the outer skin 3, and the ends thereof facing the center of the fuselage are connected to the adjacent rib 5. The inclined path of the additional members 37 relative to the ribs 5, together with the rib 5 to which the additional members 37 are connected, combine to produce a horseshoe-shaped path.

As the oblique portions 31 extend in an inclined plane and the outer skin 3, in particular in the upper region of the fuselage structure 1, has a substantially circular cross section, a connecting line 39 extending in a curved manner is produced in each case between the outer skin 3 and the oblique portion 33.

In order to strengthen further the connection between the oblique portions 33 and the rib elements 35, strut elements 41 are provided between the additional members 37 and the rib elements 35, the strut elements connecting both together.

By the construction of the fuselage structure 1 with the first and second longitudinal members 15, 19 extending in each case on both sides of the recess 7 parallel to one another, which, as is revealed from FIGS. 1 and 2, in addition to the connection to the ribs 5 extending on the other side of the recess 7, are also fixedly connected to the crossmembers 13, the loads which are otherwise absorbed by the upper portion of the fuselage structure 1 are forwarded in the vicinity of the vertically extending longitudinal central plane 6 around the recess 7. This is additionally assisted by the path of the oblique portions 33, the connection thereof to the crossmembers 13 as well as the additional members 37 extending at an angle. Thus it is ensured that the forces are introduced into the upper portion of the outer skin 3.

Moreover, the region around the recess 7 is also particularly stabilized as the first and second longitudinal members 15, 19 provided on both sides of the recess 7 form "torsion boxes" with the outer skin 3 and the ribs 5, 5' connecting the longitudinal members 15, 19. The support surfaces are received thereon via the first retaining tabs 27, 31, so that the loads thus produced are introduced via said "torsion boxes" into the fuselage.

With the design according to the subject matter herein of a fuselage structure 1, it is thus possible to forward forces in the longitudinal direction absorbed in the upper portion thereof around the recess 7 for the wing torsion box, without it being necessary to provide supports or the like extending over the length of the recess 7.

What is claimed is:

1. An aircraft fuselage structure extending along a longitudinal axis, the fuselage structure comprising an outer skin which surrounds an internal space, comprising a plurality of circumferential ribs which are spaced apart from one another and which extend in planes perpendicular to the longitudinal axis along the outer skin, wherein a recess is provided for receiving a wing torsion box in the outer skin, the recess extending in a direction of the longitudinal axis via a plurality of ribs from a front transverse edge to a rear transverse edge, wherein the recess extends in a circumferential direction from a vertical longitudinal central plane symmetrically on both sides as far as longitudinal edges extending parallel to the longitudinal axis and wherein the ribs are interrupted in a region of the recess, and wherein:
first longitudinal members are provided, the first longitudinal members being adjacent to the recess and extending along the longitudinal edges beyond an entire length of the recess,
end regions of the first longitudinal members are connected to ribs which extend circumferentially at intervals from the transverse edges of the recess along the outer skin over the vertical longitudinal central plane,
ends of the ribs facing the recess are connected to the first longitudinal members,
second longitudinal members are provided, the second longitudinal members extending parallel and at intervals from the first longitudinal members and being arranged on the side of the first longitudinal members facing away from the recess, and
end regions of the second longitudinal members are connected to ribs which extend circumferentially at intervals from the transverse edges of the recess along the outer skin over the vertical longitudinal central plane.

2. The aircraft fuselage structure according to claim 1, wherein ribs extending in the region of the recess between the first and the second longitudinal members have rib portions extending perpendicular to the first and second longitudinal members, which connect the first and the second longitudinal members together.

3. The aircraft fuselage structure according to claim 2, wherein two of the rib portions have first retaining tabs which extend through recesses in the first longitudinal members and which are provided for pendulum supports for retaining the wing torsion box.

4. The aircraft fuselage structure according to claim 1, wherein the second longitudinal members have second retaining tabs for retaining support surfaces and wherein the second retaining tabs extend through the outer skin.

5. The aircraft fuselage structure according to claim 1, wherein crossmembers extend in a linear manner along the transverse edges of the recess, and wherein oblique portions are provided between the crossmembers and the outer skin, the oblique portions extending in planes which are inclined relative to the longitudinal axis and which slope away from the outer skin towards the crossmembers.

6. The aircraft fuselage structure according to claim 5, wherein rib elements are arranged on the inwardly facing side of the oblique portions, the rib elements extending perpendicular to the crossmembers.

7. The aircraft fuselage structure according to claim 6, wherein additional members extending at an angle to the ribs are provided, the additional members extending along a connecting line between the oblique portions and the outer skin and ends the additional members facing a center of the fuselage are connected to an adjacent rib.

8. The aircraft fuselage structure according to claim 7, wherein strut elements extend between the rib elements and the additional members.

* * * * *